March 1, 1938. W. S. PIERCE, JR 2,109,976
CENTER FINDING DEVICE
Filed Nov. 23, 1936
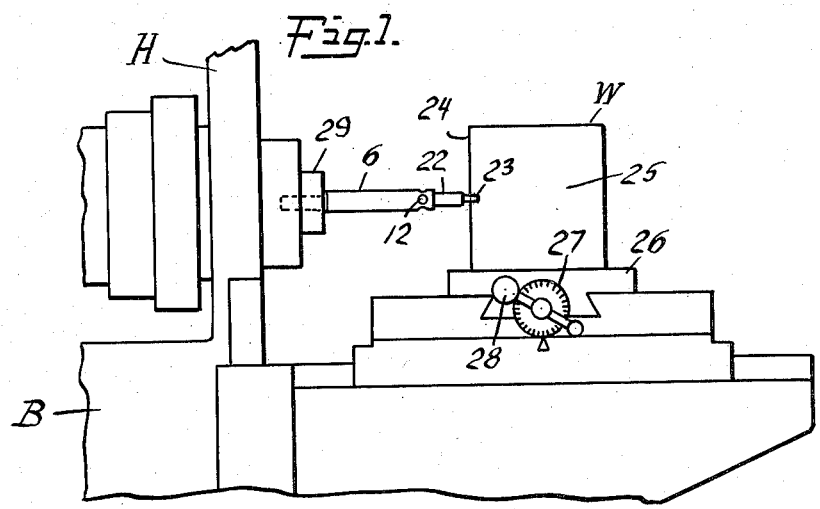
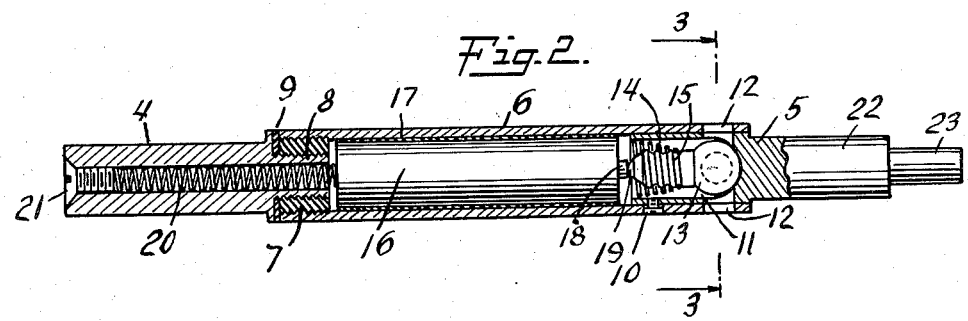
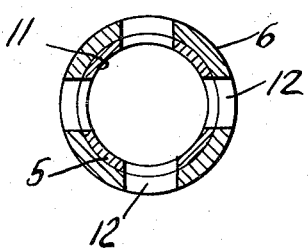
INVENTOR
Winslow S. Pierce Jr.
BY
Pennie, Davis, Marvin & Edmonds
HIS ATTORNEYS Patented Mar. 1, 1938

2,109,976

UNITED STATES PATENT OFFICE 2,109,976

CENTER FINDING DEVICE

Winslow S. Pierce, Jr., Bayville, N. Y.

Application November 23, 1936, Serial No. 112,233

6 Claims. (Cl. 177—311)

This invention relates to a precision centering device for use on lathes, jig borers, planers, milling and similar machines, and more particularly concerns an improved device by means of which a surface, edge or other point on a piece of work may be accurately aligned with the axis of rotation of a tool carrying or other rotary part of the machine.

In the fabrication and finishing of many devices or elements by machine work, it is frequently essential that some cutting, drilling or other machining operation be performed at a point on the work which must be located with a high degree of accuracy. Thus it may be necessary, for example, to drill a hole, cut a groove or otherwise machine an element at some point which is located at an exact distance from one or more surfaces or edges of the element. The better types of micrometer feeds now available for machine work are capable of moving the work or the tool through distances which are very accurately measurable by reference to the index or dial of the micrometer feed screw. It is however, a difficult and tedious operation to set the micrometer feed index at a datum or zero position in which the tool center will be accurately aligned with the edge, surface or other point of the work from which the precise measurement is to be made.

With the above and other considerations in mind, it is proposed in accordance with the present invention to provide an improved unitary centering device by means of which any edge or surface of a piece of work may be accurately aligned or centered with respect to the axis of the rotary tool holding element or chuck of a milling machine, planer, lathe or like apparatus. The objects of the invention further embrace the provision of a device of this nature which is extremely compact and rugged in construction and which embodies structural features permitting the centering operation to be performed both quickly and with an extremely high degree of accuracy.

In carrying out the above and other objects of the invention, I provide an elongated and substantially cylindrical device having at its opposite ends axially aligned cylindrical portions of electrically conductive material. One such end cylindrical portion is the machine engaging portion and is adapted to be held in or otherwise fixed to the chuck or other rotary tool holding part of the machine. The cylindrical portion at the other end of the device is the work engaging portion which touches a surface, edge or other part of the work during the centering operation. The intermediate portion of the device connects the end portions in alignment and preferably carries and encloses an electric battery and a suitable electrically responsive signaling device such as a lamp, connected in series between the two end portions of the device. With this arrangement, contact between the work engaging end portion of the device and a surface or edge of a conductive piece of work mounted on the machine completes a circuit which energizes the signaling device and thus notifies the operator that the work has been moved exactly to a desired point. The precise manner in which the improved device performs a typical centering operation will be explained in detail below.

In describing the invention, reference will be made to the accompanying drawing in which a typical embodiment thereof has been illustrated. In the drawing:

Figure 1 is an elevation showing the improved centering device in use on a milling machine;

Figure 2 is an enlarged sectional view of the improved centering device; and

Figure 3 is a cross sectional view of the device taken along the line 3—3 of Figure 2 and viewed in the direction of the arrows.

Referring particularly to Figure 2 of the drawing, the disclosed embodiment of my device comprises generally a cylindrical metallic machine engaging end portion 4 and a cylindrical metallic work engaging end portion 5 with a hollow tubular portion 6 connected therebetween. The machine engaging portion 4 is securely fastened to but electrically insulated from the hollow tubular portion 6 by any suitable means. As shown, an insulating sleeve 7 is internally threaded to a central extension 8 on the inner end of the portion 4, and the tubular portion 6 is threadedly connected to the extension by the sleeve 7, an insulating washer 9 being disposed between abutting surfaces of the end portion 4 and the tubular portion 6.

The work engaging end portion 5 is fixed to the tubular portion 6 in any suitable manner and as shown, one end of the portion 5 has a press fit within the end of the tubular portion 6. A set screw 10 countersunk within the cylindrical surface of the portion 6 engages the portion 5.

A central recess 11 is provided within that part of the end portion 5 which fits within the tubular portion 6. A plurality of radial openings 12 extend from the recess 11 to the surface of the device through the tubular portion 6 as shown. An electric lamp 13 is mounted in the recess 11 with its bulb in substantial alignment with the radial openings 12. Suitable conductive connecting means such as the spirally wound metal spring 14 engages the threaded contact 15 of the lamp and also frictionally engages the inner surface of the recess 11. In this manner, the lamp 13 is removably supported centrally within the recess and the contact 15 thereof is electrically connected to the end portion 5. A battery 16, enclosed within an insulating tube 17, is disposed within the hollow central portion 6. The center contact 18 of the battery 16 engages the center contact 19 of the lamp 13. Suitable means, such as a compressed spring 20, serves to electrically connect the other end contact of the battery 16 with the machine engaging end portion 4 of the device. The spring 20 may be held within a central opening in the end portion 4 by a screw 21 as shown.

The work engaging end portion 5 preferably includes a plurality of axially aligned cylindrical sections of different diameters, and in the disclosed embodiment, two such cylindrical sections 22 and 23 have been shown. The diameters of these cylindrical sections are preferably even multiples of tenths of an inch for a purpose to be explained.

The centering device of the invention may be used to perform a wide variety of precision measuring operations, a typical example of which will be explained. Referring to Figure 1, it will be assumed that it is necessary to drill a hole or perform some other cutting operation with a rotary tool in the end face 24 of a metal block of work W, and that the center of the hole must be accurately located at a given distance from the side face 25 of the block. The block W is fixed by known means to the transversely movable table 26 of a suitable machine which is shown as a milling machine. The table 26 is equipped with an accurate transverse micrometer feed of known construction represented by the index or dial 27 and the operating handle 28. It will be understood that the table 26 may be movable vertically and longitudinally as well as transversely, and that micrometer feed means may be provided for all such movements. The table 26 is electrically connected through the bed B of the machine to the head H carrying the chuck 29 or other rotary tool holding element. It is assumed that the side face 25 of the block W is to be aligned with the axis of rotation of the chuck 29 and it is further assumed that this surface is disposed parallel to the axis of the chuck.

The improved centering device is now mounted with its machine engaging end portion 4 in the chuck 29. The device need not be accurately aligned with the axis of rotation of the chuck, since all errors due to departure of the device from this axis are eliminated during its operation. The surface 25 of the block W is now advanced transversely toward one of the cylindrical work engaging sections 23 of the device, and the chuck 29 is rotated slowly. At the first contact of the block surface 25 with the cylindrical section 23, an energizing circuit for the lamp 13 is completed through the block W and the connected parts of the machine. The lamp 13 of the device then lights intermittently, one contact being made for each revolution of the device, which is assumed to be slightly off center from the axis of rotation. The chuck 29 is then turned slowly by hand to the point where the lamp 13 lights and remains on, and the micrometer feed index 27 is read at this point. The chuck 29 is next turned manually exactly half a revolution and the micrometer feed is advanced just to the point where the lamp 13 again lights, and in this position, another micrometer index reading is taken. The feed is then set back an amount equal to half the difference between the two readings taken, and the centering device is removed from the chuck 29. The micrometer feed is next advanced by an amount equal to half the diameter of the work engaging cylindrical section 23 used. By these operations, the block W is so placed that the axis of rotation of the chuck 29 lies exactly in the plane of the block face 25 and all measurements inward along the end face 24 may be accurately made by merely operating the micrometer feed to advance the block the required distance.

Standard micrometer feeds are usually so designed that one complete revolution of the index or dial 27 advances the table exactly one-tenth of an inch. Since the cylindrical work engaging sections 22 and 23 of the improved centering device have diameters which are even multiples of tenths of an inch, the final advancing of the work by half the diameter of the work engaging section is conveniently accomplished by turning the micrometer feed a whole number of complete revolutions. In addition to the work engaging sections 22 and 23, the barrel or central portion 6 of the device may be used to engage the work, and in this manner, three work engaging cylindrical surfaces are provided. It is desirable in this connection that the diameter of the portion 6 be an even multiple of tenths of an inch for the purpose explained above.

The construction of the device may be considerably varied from that of the typical embodiment shown. Thus, for example, the incandescent lamp may be replaced by any other suitable electrically responsive signal or indicator, such as an audible bell or buzzer. The number and size of the work engaging sections 22 and 23 may be varied as desired. In general, the smallest work engaging section 23 should have a diameter somewhat less than the smallest work opening from the inner surfaces of which measurements are to be made.

The improved centering device of the present invention is applicable to many precision settings and measurements other than that described above. For example, the improved device may be used to align the rotary tool axis of a machine with internal or external curved surfaces, whether of cylindrical or other curvature. In this manner, the device simplifies the accurate location of concentric or eccentric holes, grooves or other cutting operations in cylindrical objects, such as shafts, pistons, bearing raceways, etc. In all applications, the device of the invention performs the desired centering functions with a high degree of speed and accuracy.

I claim:

1. A unitary centering device comprising a conductive cylindrical machine engaging portion and a conductive cylindrical work engaging portion disposed in spaced axial alignment with a hollow portion therebetween, means for electrically insulating said conductive cylindrical portions from each other, and electric signaling means comprising a source of electrical energy and an electrically responsive indicator connected in series between said conductive cylindrical portions and housed within said hollow portion, said hollow portion having openings therein to permit egress of signals from said indicator.

2. A unitary centering device comprising spaced electrically conductive cylindrical end portions, an intermediate portion mechanically connecting said end portions in axial alignment, means electrically insulating said end portions from each other and an electric battery and lamp connected in series between said end portions and disposed within said intermediate portion, said intermediate portion having openings therein permitting observation of said lamp.

3. A unitary centering device comprising a cylindical electrically conductive machine engaging portion, an electrically conductive work engaging portion comprising a plurality of axially aligned cylindrical sections of different diameters, means for mechanically connecting said machine and work engaging portions in axial alignment, means for electrically insulating said machine and work engaging portions from each other and an electric battery and lamp carried by said device and connected in series between said conductive machine and work engaging portions, said device having openings therein permitting observation of said lamp.

4. A unitary centering device for use in aligning work with the axis of a rotary machine part comprising a cylindrical conductive work engaging portion, a cylindrical conductive machine engaging portion, a hollow element connecting said machine and work engaging portions in axially aligned spaced relation, means for mutually electrically insulating said work and machine engaging portions, a battery and an electric lamp disposed within said hollow connecting element, said hollow element having openings therethrough permitting observation of said lamp and means for electrically connecting said battery and lamp in series between said work and machine engaging portions whereby an energizing circuit for said lamp is completed through a conductive machine carrying said machine engaging portion upon contact between said work engaging portion and a conductive piece of work carried by said machine.

5. A unitary centering device for use in aligning work with the axis of a rotary machine part comprising a cylindrical conductive work engaging portion including a plurality of axially aligned cylindrical sections of different diameters, a cylindrical conductive machine engaging portion, a hollow element connecting said work and machine engaging portions in axially aligned spaced relation, means for electrically insulating said work and machine engaging portions from each other, a battery and an electric lamp disposed within said hollow connecting element, said hollow element having openings therethrough permitting observation of said lamp and means for electrically connecting said battery and lamp in series between said work and machine engaging portions whereby an energizing circuit for said lamp is completed through a conductive machine carrying said machine engaging portion upon contact between said work engaging portion and a conductive piece of work carried by said machine.

6. A unitary centering device comprising a conductive cylindrical machine engaging portion, a conductive cylindrical work engaging portion, a hollow tubular intermediate portion connecting said machine and work engaging portions in axial alignment, means for mutually insulating said machine and work engaging portions, said work engaging portion having a recess therein opening into said interior of said work engaging portion, an electric battery carried within said intermediate portion, an electric lamp carried within the recess of said work engaging portion and electrically connected thereto, and means electrically connecting said battery between said lamp and said machine engaging portion, said device having openings communicating with said recess for the observation of said lamp.

WINSLOW S. PIERCE, JR.